Oct. 26, 1926.

O. L. WILLIAMS 1,604,211

HOSE COUPLING

Filed July 1, 1925

INVENTOR.
ORVAL L. WILLIAMS.

BY

ATTORNEY.

Patented Oct. 26, 1926.

1,604,211

UNITED STATES PATENT OFFICE.

ORVAL L. WILLIAMS, OF KENMORE, OHIO.

HOSE COUPLING.

Application filed July 1, 1925. Serial No. 40,772.

This invention relates to hose or pipe couplings.

The chief object of the invention is to provide an improved coupling capable of being easily and quickly operated even under adverse conditions, such as when used on fire hose requiring the coupling of hose sections in the dark, and particularly to provide a coupling, the members of which are exactly alike so that either end of one hose section may be readily secured to either end of another section.

Another object is to provide a coupling of the kind described above, which will be constructed to withstand hard usage, as for example of fire hose, and will so couple the sections as to prevent any substantial loss in pressure due to leakage.

The foregoing and ancillary objects are obtained by the construction illustrated in the accompanying drawings and described in detail below. It is to be understood that the invention is not limited to the specific construction shown and described.

Figure 1:
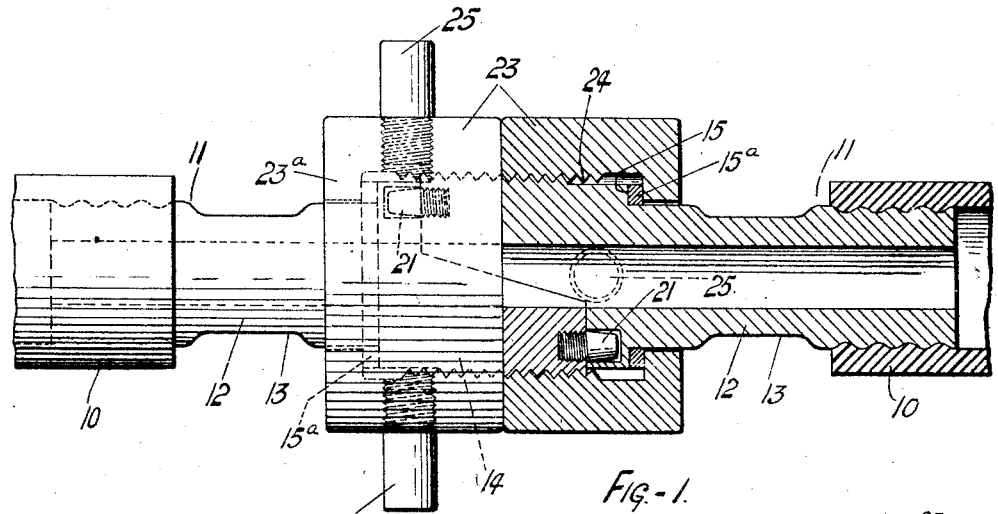
Figure 1 is a view partly in elevation and partly in section illustrating hose ends secured together by the improved coupling.

Referring to the drawings, 10, 10 represent hose sections having secured in their ends, in any suitable manner, mating nipples 11, 11 each exactly alike and each formed with a generally cylindrical portion 12 flattened as at 13 to be gripped by a spanner when desired or necessary to uncouple the sections 10. Each nipple 11 has formed thereon an enlarged portion 14 providing a shoulder 15 against which is seated a gasket 15ª preferably of rubber. Portions 14 have tongues or extensions 16 thereon formed of the shape shown which may be described as defined by a vertical plane providing an abutting face 17 extending substantially one third the distance across a diameter of the nipple, an inclined plane defining an overlapping face 18 extending rearwardly on the nipple another third of the diameter and defining an obtuse angle with said vertical plane, and a second vertical plane defining an abutting face 19 extending the remainder of the distance across the diameter of the nipple. The tongues 16 are threaded at 20, 20 in such manner that when mated, the threads 20 cooperate to form a continuously, externally threaded cylindrical portion.

With the form of tongues 16 shown, the mating of the tongues is brought about by merely sliding one face 18 onto the other face 18 until the faces 17 and 19 engage each other. The nipples are accordingly moved together longitudnally. To facilitate proper registry of the tongues with each other, a projecting pin 21 is provided on each face 17 and a socket 22 for receiving each tongue is provided in each face 19.

For securing the two nipples together, preferably each one has thereon a union 23 arranged to slide on portion 12 of each nipple and internally threaded at 24 so as to be adapted to engage over threads 20 of both nipples. Either union 23 will secure the nipples together but both ends of a hose section are preferably supplied therewith so that a union 23 will always be at the joint of one end to any other. The unions 23 are preferably arranged so that both may be screwed onto the mating tongues 20 into abutting relation thereon.

Each union 23 is provided with an inner flange 24 for holding it on the nipple and adapted to compress each gasket 15ª against shoulder 15. Each union 23 also preferably has projecting pins 25, 25 thereon to facilitate its operation.

Figure 2:
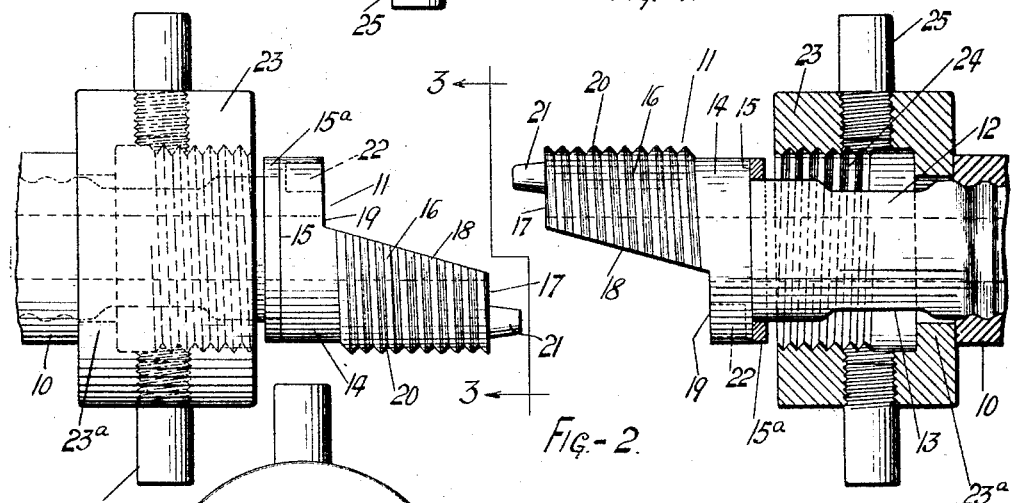
Figure 2 is a similar view showing the hose ends separated.
Figure 3:
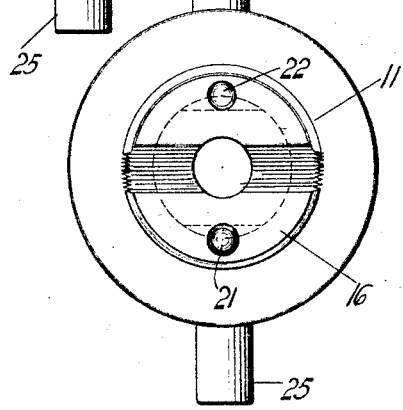
Figure 3 is an end elevation of one coupling as on line 3—3 of Figure 2.

In use, to join the two ends of hose together, they are aligned in the manner illustrated in Figure 2. The nipples 11 are then forced together as will be understood, pins 21 serving to guide them into proper registry, and the unions 23 are screwed onto the mating tongues 16 tightly against gaskets 15. To uncouple, the unions 23 are unscrewed—a spanner being used on portions 12 thereof if necessary to facilitate this operation—and the nipples are then readily pulled apart.

It will be noted that with the coupling shown, any leakage through the joint of the nipples 16 (which will be slight if they are properly formed) will have to follow around the threads 20 and past the gaskets 15ª in seeking an outlet. Thus pressure in the system is maintained. It will also be noted that by forming the tongues 16 in the manner shown the joining and registering thereof is greatly facilitated and they are strongest where connected onto the body portion of the nipple so that bending or breaking of the tongues by rough handling is avoided.

Modifications of the invention may be resorted to without departing from the spirit thereof or the scope of the appended claims.

What is claimed is:

1. A pipe coupling comprising a pair of nipples, each of the same construction and each formed with tongues having abutting and overlapping faces and arranged to slide longitudinally in overlapping relation to each other, the overlapping faces being at an inclination to the axis of the nipple and the abutting faces having interengaging projections and recesses for guiding the nipples into proper registry, said tongues having registering screw threads thereon, a union slidably carried by each nipple and adapted to be screwed onto the registering screw threads over the joint between the nipples, each nipple having a shoulder thereon and each union a flange for engaging said shoulder and a gasket between each said cooperating flange and shoulder.

2. A pipe coupling comprising a pair of nipples, each of the same construction and each formed with tongues having abutting and overlapping faces and arranged to slide longitudinally in overlapping relation to each other, the overlapping faces being at an inclination to the axis of the nipple and the abutting faces having interengaging projections and recesses for guiding the nipples into proper registry, said tongues having registering screw threads thereon, and a union slidably carried by each nipple and adapted to be screwed onto the registering screw threads over the joint between the nipples.

ORVAL L. WILLIAMS.